United States Patent
Lo et al.

(12) 
(10) Patent No.: US 12,015,544 B1
(45) Date of Patent: Jun. 18, 2024

(54) BACKUP ROUTE FOR NETWORK DEVICES IN MULTIHOMING CONFIGURATION

(71) Applicant: Arista Networks, Inc., Santa Clara, CA (US)

(72) Inventors: Alton Lo, Fremont, CA (US); Rajesh Semwal, San Ramon, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/310,330

(22) Filed: May 1, 2023

(51) Int. Cl.
*H04L 45/00* (2022.01)
*H04L 45/44* (2022.01)
*H04L 45/74* (2022.01)

(52) U.S. Cl.
CPC .............. *H04L 45/22* (2013.01); *H04L 45/44* (2013.01); *H04L 45/74* (2013.01)

(58) Field of Classification Search
None
See application file for complete search history.

(56) References Cited

U.S. PATENT DOCUMENTS

| 11,088,871 | B1 * | 8/2021 | Lin | H04L 45/02 |
|---|---|---|---|---|
| 2009/0245259 | A1 * | 10/2009 | Filsfils | H04L 45/04 370/392 |
| 2019/0229937 | A1 * | 7/2019 | Nagarajan | H04L 12/18 |
| 2020/0127919 | A1 * | 4/2020 | Nagarajan | H04L 45/28 |
| 2020/0244485 | A1 * | 7/2020 | Gao | H04L 45/66 |
| 2020/0322268 | A1 * | 10/2020 | Thoria | H04L 45/507 |
| 2021/0092045 | A1 * | 3/2021 | Nagarajan | H04L 12/1886 |
| 2022/0103425 | A1 * | 3/2022 | Lo | H04L 41/0813 |
| 2022/0417141 | A1 * | 12/2022 | Thoria | H04L 12/4633 |
| 2023/0095253 | A1 * | 3/2023 | Lin | H04L 12/4633 370/218 |
| 2023/0126279 | A1 * | 4/2023 | Lin | H04L 12/4675 370/389 |

OTHER PUBLICATIONS

LA. Burdet, ED. et al., EVPN Fast Reroute, Oct. 23, 2022, Internet-Draft: draft-burdet-bess-evpn-fast-reroute-03, Internet Engineering Task Force (IETF).
A. Sajassi, ED., et al., BGP MPLS-Based Ethernet VPN, Feb. 2015, pp. 1-56, ISSN: 2070-1721, Internet Engineering Task Force (IETF).

* cited by examiner

*Primary Examiner* — Joshua Joo
(74) *Attorney, Agent, or Firm* — Treyz Law Group, P.C.; Tianyi He

(57) ABSTRACT

First and second network devices may be configured to multihome a host. The first network device may advertise a first MAC and IP advertisement route indicative of a first link between the first network device and the host. The second network device may advertise a backup MAC and IP advertisement route indicative of a second link between the second network device and the host. Based on the backup MAC and IP advertisement route, the first network device may store a backup path for reaching the host via the second network device. After failure of the first link, the first network device may forward traffic destined for the host based on the stored backup path.

20 Claims, 9 Drawing Sheets

BACKUP ROUTE FOR NETWORK DEVICES IN MULTIHOMING CONFIGURATION

BACKGROUND

This relates to network devices, and more particularly, to network devices configured to multihome a host via corresponding links.

As an example, network devices implementing an Ethernet Virtual Private Network (EVPN) can advertise routes to exchange address reachability information with one another. This exchange of network reachability information can occur using Multiprotocol Border Gateway Protocol (MP-BGP) and the routes can include EVPN Network Layer Reachability Information (NLRI). Multiple EVPN network devices can be coupled to the same host via corresponding Ethernet links, thereby providing multihoming for the host. Depending on the configuration of the multiple EVPN network devices, one or more of the multiple network devices can provide traffic forwarding to the host.

DETAILED DESCRIPTION

Figure 1:
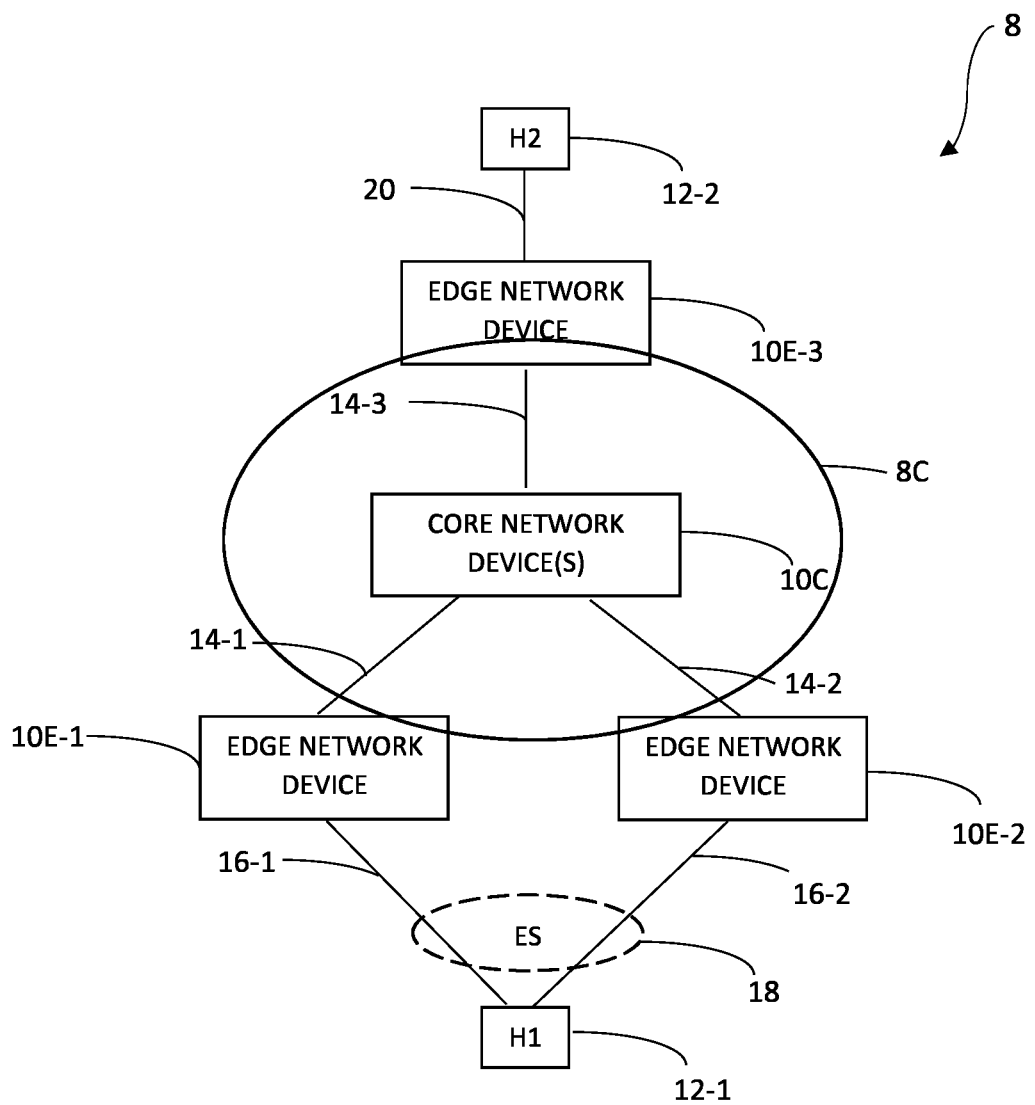
FIG. 1 is a diagram of an illustrative network having one or more edge network devices in accordance with some embodiments.

A network can convey network traffic (e.g., in the form of one or more packets, one or more frames, etc.) between host devices. To properly forward the network traffic, the network can include a number of network devices. Some of these network devices may implement an Ethernet Virtual Private Network (EVPN) by exchanging network reachability information in the form of EVPN route information with one another and by processing the exchanged information. These network devices are sometimes referred to herein as EVPN peer network devices, EVPN peer devices, EVPN devices, and/or EVPN speakers.

Configurations in which the exchange of EVPN route information (e.g., MAC and IP address advertisement route information) occurs using Border Gateway Protocol (BGP), or more specifically Multiprotocol BGP (MP-BGP), and/or with Virtual Extensible LAN (VXLAN) or Multiprotocol Label Switching (MPLS) tunneling technology (e.g., using VXLAN or MPLS infrastructure, MPLS labels, etc.) are sometimes described herein as illustrative examples. If desired, the exchange of network reachability information can occur with other types of control plane routing protocol and/or utilizing other types of core network overlay infrastructure.

In some configurations described herein as an example, two EVPN peer devices may form a single-active (sometimes referred to as active-standby) multihoming configuration for one or more host devices, or generally a network portion, coupled to an Ethernet segment. The local link of the active EVPN peer device coupled to the Ethernet segment can sometimes experience a failure event which can at least temporarily disrupt the forwarding of traffic to the device(s) on the Ethernet segment. In preparation for the failure event and to minimize the disruption, the active EVPN peer device may compute and store a backup best path for the Ethernet segment based on a backup MAC and IP advertisement route advertised by the standby EVPN peer device. After the failure event, the active EVPN peer device may forward traffic to the Ethernet segment via the standby EVPN peer device. Once the standby EVPN peer device receives the route withdrawal (e.g., Ethernet auto-discovery route) message for the Ethernet segment from the (previously) active EVPN device, the standby EVPN peer device may be promoted as and continue operations as the new active EVPN peer device.

This example of handling a link failure in a single-active multihoming configuration is merely illustrative. If desired, two EVPN peer devices configured in an all-active (sometimes referred to as active-active) multihoming configuration may similarly store corresponding backup best path(s) based on respective advertised backup advertisements route (s) to facilitate efficient handling of traffic destined for multihomed host(s), as another illustrative example.

An illustrative networking system in which network devices, such as the two EVPN peer devices in the multihoming configurations as described above, operate is shown in FIG. 1. A network such as network 8 may be of any suitable scope and/or form part of a larger network of any suitable scope. As examples, network 8 may include, be, or form part of one or more local segments, one or more local subnets, one or more local area networks (LANs), one or more campus area networks, a wide area network, etc. Network 8 may include any suitable number of different network devices that connect corresponding host devices of network 8 to one another. If desired, network 8 may include or be coupled to internet service provider networks (e.g., the Internet) or other public service provider networks, private service provider networks (e.g., multiprotocol label switching (MPLS) networks), and/or other types of networks such as telecommunication service provider networks (e.g., a cellular network based on one or more standards as described in the 3GPP specifications such as GSM, UMTS, LTE, 5G, etc.).

As shown in FIG. 1, network 8 may include a core network or core network portion 8C interconnecting different edge networks or edge network portions (sometimes referred to herein as sites or domains). As one illustrative example, core network portion 8C may be or form a backbone network such as a service provider network (e.g., an Internet or IP service provider network, a MPLS network, a cloud provider network, or generally a communication network core). Core network portion 8C may connect different edge network portions belonging to one or more entities (e.g., customers) different from (or the same as) the one or more entities that provide core network portion 8C. In configurations in which network devices implement one or more EVPN instances over core network portion 8C, core network portion 8C may sometimes be referred to herein as an EVPN core or generally an underlay network.

Core network devices 10C may sometimes be referred to as provider (network) core devices whereas edge network devices 10E may sometimes be referred to as provider (network) edge devices. Core network portion 8C may include core network devices 10C that are interconnected with each other within core network portion 8C. Network paths 14 (e.g., one or more paths 14-1, one or more paths 14-2, and one or more paths 14-3) couple one or more core network devices 10C to edge network devices 10E (e.g., devices 10E-1, 10E-2, and 10E-3) that interface the core network devices 10C with the edge network portions. These edge network portions (e.g., sites or domains) may each include its own respective set of network device(s) and host device(s) such as device 12-1 for a first site and device 12-2 for a second site.

In the example of FIG. 1, edge network device 10E-3 couples core network 8C to device 12-2 via network path 20. Device 12-2 may form part of an edge network portion (e.g., a customer network portion) of network 8. Edge network devices 10E-1 and 10E-2 couples core network 8C to device 12-1 via network paths 16-1 and 16-2, respectively. Device 12-1 may form part of an edge network portion (e.g., a customer network portion). Devices 12-1 and 12-2 may each be a host device and/or a network device of the corresponding edge network portions. In scenarios in which devices 12-1 and/or 12-2 are network devices, host devices may further be coupled to network devices 12-1 and/or 12-2. In other words, host devices may not be directly attached to edge network devices 10E-1, 10E-2, and 10E-3 and may instead be attached to edge network devices 10E-1, 10E-2, and 10E-3 (e.g., Ethernet segment 18) via one or more corresponding intervening (customer) edge network devices.

Network devices in network 8 such as provider edge network devices 10E, provider core network devices 10C, and network devices 12-1 and 12-2 (e.g., when implemented as network devices) may each include or be a switch (e.g., a multi-layer L2/L3 switch), a bridge, a router, a gateway, a hub, a repeater, a firewall, a wireless access point, a network device serving other networking functions, a network device that includes the functionality of two or more of these devices, a management device that controls the operation of one or more of these network devices, and/or other types of network devices. Configurations in which provider edge network devices 10E-1, 10E-2, and 10E-3 are (multi-layer) switches or routers, or generally include routing functionalities (e.g., implements routing protocols) are described herein as an illustrative example.

Host devices or host equipment in network 8 such as devices 12-1 and 12-2 (when implemented as host devices) and other host equipment serving as end hosts may each include or be a computer, a server or server equipment, a portable electronic device such as a cellular telephone, a laptop, etc., a network service and/or storage device, network management equipment that manages and controls the operation of one or more of host devices and network devices, and/or any other suitable types of specialized or general-purpose host computing equipment, e.g., running one or more client-side and/or server-side applications. These network devices and host devices may sometimes be referred to herein generally as networking equipment. Configurations in which devices 12-1 and 12-2 are hosts and/or are implemented on server equipment (e.g., forming compute servers, storage servers, and/or management servers) are sometimes described herein as an illustrative example.

Networking equipment (e.g., network devices and host devices) in network 8 may be connected by one or more wired technologies or standards such as Ethernet (e.g., using copper cables and/or fiber optic cables), thereby forming a wired network portion of network 8 (e.g., including core network portion 8C and portions of edge network portions). If desired, network 8 may also include one or more wireless network portions that extend from the wired network portion.

In some configurations described herein as an example, edge network devices 10E may implement an EVPN (e.g., one or more EVPN instances) over core network 8C, and accordingly, may be referred to as EVPN peer devices with respect to each other. In these illustrative configurations, the EVPN peer devices may exchange EVPN route information such as EVPN NLRIs with one another over core network 8C. EVPN NLRIs may contain different types of route information such as Ethernet auto-discovery route information, MAC and IP address advertisement route information, and other types of EVPN route information (e.g., generally BGP EVPN routes as specified in RFC 7432). The EVPN route information (e.g., conveyed using BGP messages containing the EVPN route information) may be exchanged based on any suitable underlying transport layer and internet layer protocol(s) that facilitate communication across underlay network 8C. Underlay network 8C (and the devices 10C therein) may provide and implement underlying infrastructure over which a VXLAN or MPLS overlay network (e.g., containing one or more corresponding tunnels) is implemented.

While address reachability information may be exchanged based on any suitable routing protocol, arrangements in which EVPN peer devices such as devices 10E-1, 10E-2, and 10E-3 exchange MAC and Internet Protocol (IP) address reachability information with one another using BGP, or more specifically MP-BGP, are described herein as an illustrative example. In these arrangements, devices 10E-1, 10E-2, and 10E-3 may sometimes be referred to as BGP and/or EVPN speakers (e.g., configured to advertise and process corresponding advertised BGP and/or EVPN route information).

The use of BGP (e.g., MP-BGP) with a VXLAN or MPLS overlay network to implement the exchange of EVPN route information is merely illustrative. If desired, other routing protocols (or generally other control plane protocols) and/or other types of overlay network infrastructure may be used to facilitate the exchange of EVPN route information between EVPN peer devices.

As further shown in FIG. 1, network devices 10E-1 and 10E-2 may provide multihoming via local link 16-1 (e.g., local to network device 10E-1 but remote from network device 10E-2) and local 16-2 (e.g., local to network device 10E-2 but remote from network device 10E-1) that collectively form Ethernet segment 18. One or more devices such as device 12-1 may be coupled to or belong to Ethernet segment 18. In the example of device 12-1, multihoming is provided by Ethernet links 16-1 and 16-2, collectively forming Ethernet segment 18, through which network traffic can reach the multihomed device 12-1.

In some configurations described herein as an example, network devices 10E-1 and 10E-2 may implement a single-active configuration where only one of network device 10E-1 and network device 10E-2 is configured in an active configuration or state that forwards network traffic to the multihomed device(s) via its local link and the other one of network device 10E-1 and network device 10E-2 is configured in a standby configuration or state that does not forward network traffic to the multihomed device(s). This is merely illustrative. If desired, network devices 10E-1 and 10E-2 may implement an all-active configuration (sometimes referred to as an active-active configuration) where network device 10E-1 and network device 10E-2 are each configured in an active configuration or state that forwards network traffic to the multihomed device(s) via its respective local link. The embodiments described herein may be analogously applied to network devices 10E-1 and 10E-2 in this all-active configuration.

Figure 2:
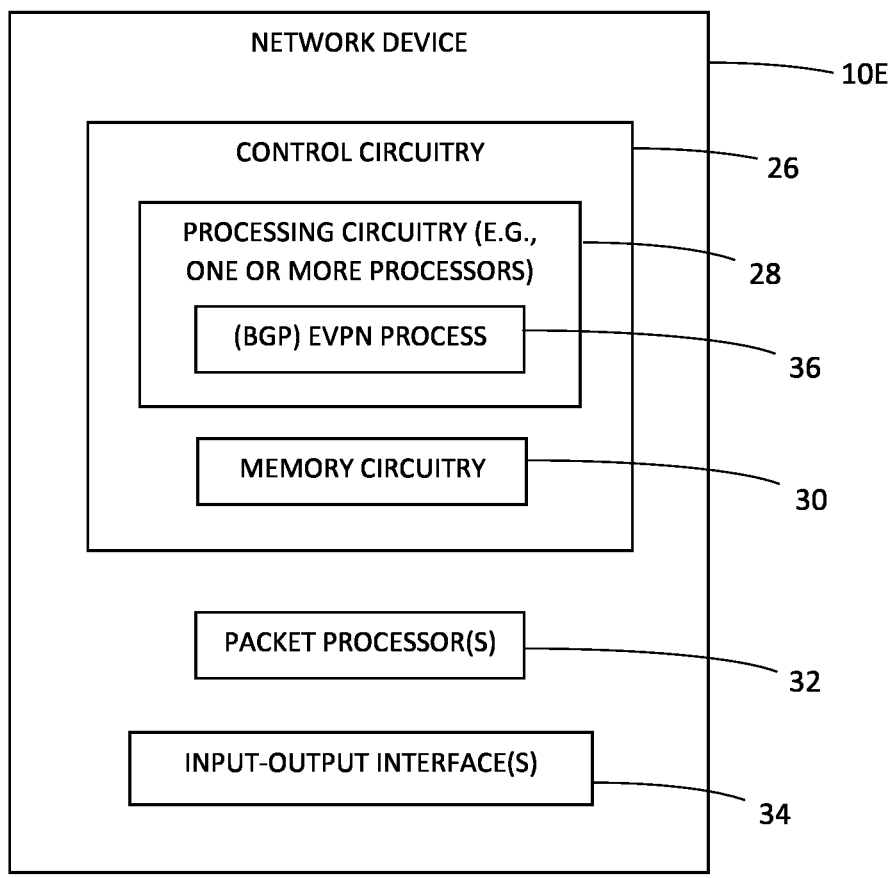
FIG. 2 is a diagram of an illustrative network device in accordance with some embodiments.

FIG. 2 is a diagram of an illustrative EVPN network device (e.g., implementing each of edge network devices 10E-1, 10E-2, and/or 10E-3 in FIG. 1) configured to exchange routing information with other EVPN peer devices (e.g., using BGP). If desired, other network devices such as network devices 10C (FIG. 1), (customer) site edge network devices, and/or other network devices connected to the (provider) edge network devices may have at least some (e.g., all) of the same components as the network device depicted in FIG. 2 but may optionally omit execution of a BGP and/or EVPN process at the processing circuitry.

As shown in FIG. 2, network device 10E may include control circuitry 26 having processing circuitry 28 and memory circuitry 30, one or more packet processors 32, and input-output interfaces 34 disposed within a housing of network device 10E. In one illustrative arrangement, network device 10E may be or form part of a modular network device system (e.g., a modular switch system having removably coupled modules usable to flexibly expand characteristics and capabilities of the modular switch system such as to increase ports, provide specialized functionalities, etc.). In another illustrative arrangement, network device 10E may be a fixed-configuration network device (e.g., a fixed-configuration switch having a fixed number of ports and/or a fixed hardware configuration).

Processing circuitry 28 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Processing circuitry 28 may run (e.g., execute) a network device operating system and/or other software/firmware that is stored on memory circuitry 30. Memory circuitry 30 may include non-transitory (tangible) computer readable storage media that stores the operating system software and/or any other software code, sometimes referred to as program instructions, software, data, instructions, or code. As an example, the BGP and/or EVPN routing functions performed by network device 10E described herein may be stored as (software) instructions on the non-transitory computer-readable storage media (e.g., in portion(s) of memory circuitry 30 in network device 10E). The corresponding processing circuitry (e.g., one or more processors of processing circuitry 28 in network device 10E) may process or execute the respective instructions to perform the corresponding BGP and/or EVPN routing functions. Memory circuitry 30 may be implemented using non-volatile memory (e.g., flash memory or other electrically-programmable read-only memory configured to form a solid-state drive), volatile memory (e.g., static or dynamic random-access memory), hard disk drive storage, removable storage devices (e.g., storage device removably coupled to device 10E), and/or other storage circuitry. Processing circuitry 28 and memory circuitry 30 as described above may sometimes be referred to collectively as control circuitry 26 (e.g., implementing a control plane of network device 10E).

As just a few examples, processing circuitry 28 may execute network device control plane software such as operating system software, routing policy management software, routing protocol agents or processes (e.g., BGP and/or EVPN process 36), routing information base agents, and other control software, may be used to support the operation of protocol clients and/or servers (e.g., to form some or all of a communications protocol stack such as the TCP/IP stack), may be used to support the operation of packet processor(s) 32, may store packet forwarding information, may execute packet processing software, and/or may execute other software instructions that control the functions of network device 10E and the other components therein.

Packet processor(s) 32 may be used to implement a data plane or forwarding plane of network device 10E. Packet processor(s) 32 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Packet processor 32 may receive incoming network traffic via input-output interfaces 34, parse and analyze the received network traffic, process the network traffic based on packet forwarding decision data (e.g., in a forwarding information base) and/or in accordance with network protocol(s) or other forwarding policy, and forward (or drop) the network traffic accordingly. The packet forwarding decision data may be stored on a portion of memory circuitry 30 and/or other memory circuitry integrated as part of or separate from packet processor 32.

Input-output interfaces 34 may include different types of communication interfaces such as Ethernet interfaces (e.g., one or more Ethernet ports), optical interfaces, a Bluetooth interface, a Wi-Fi interface, and/or other networking interfaces for connecting network device 10E to the Internet, a local area network, a wide area network, a mobile network, and generally other network device(s), peripheral devices, and other computing equipment (e.g., host equipment such as server equipment, user equipment, etc.). As an example, input-output interfaces 34 may include ports or sockets to which corresponding mating connectors of external components can be physically coupled and electrically connected. Ports may have different form-factors to accommodate different cables, different modules, different devices, or generally different external equipment.

In configurations in which network device 10E implements an EVPN with EVPN peer devices using BGP, processing circuitry 28 on network device 10E may execute a BGP EVPN process 36 (sometimes referred to herein as BGP EVPN agent 36). BGP EVPN process 36 may manage and facilitate operations as defined by or relevant to BGP and/or EVPN such as the exchange of network layer reachability information (e.g., EVPN NLRIs in the form of different EVPN routes) with other peer devices and the processing of the exchanged information. If desired, EVPN agent or process 36 may be implemented separately from a BGP agent or process.

As some examples of illustrative operations performed by processing circuitry 28, EVPN process 36 executing on processing circuitry 28 may receive peer-advertised information such as EVPN routes in the form of Ethernet auto-discovery routes, MAC and IP advertisement routes and/or other types of EVPN routes (e.g., having a route type of 1 and therefore sometimes referred to as EVPN type-1 routes), may perform path selection (e.g., best path computation based on BGP) using the peer-advertised information and/or other information, may advertise outbound information such as EVPN routes to its peers, and/or may perform other BGP and/or EVPN functions.

EVPN Ethernet auto-discovery routes (sometimes referred to as EVPN type-1 routes) may have a route type of 1 and may be advertised on a per-Ethernet-segment basis (e.g., for each attached Ethernet segment). EVPN MAC and IP (MAC-IP or MAC/IP) advertisement routes (sometimes referred to as EVPN type-2 routes) may have a route type of 2 and may be advertised on a per-host basis (e.g., for each host or device attached to each Ethernet segment).

While BGP EVPN process 36 is sometimes described herein to perform respective parts of BGP and/or EVPN operations for device 10E, this is merely illustrative. Processing circuitry 28 may be organized in any suitable manner (e.g., to have any other agents or processes instead of or in addition to a single BGP EVPN process 36) to perform different parts of the BGP and/or EVPN operations. Accordingly, processing circuitry 28 may sometimes be described herein to perform the BGP and/or EVPN operations instead of specifically referring to one or more agents, processes, and/or the kernel executed by processing circuitry 28.

Configurations in which edge network devices 10E-1, 10E-2, and 10E-3 in FIG. 1 each include respective processing circuitry executing an EVPN process (e.g., respective network device processing circuitry 28 executing a corresponding EVPN process 36) are described herein as an illustrative example. In these examples, multihoming EVPN peer devices 10E-1 and 10E-2 may be configured in a single-active (active-standby) configuration in which a designated EVPN peer device serves as the active device (e.g., to exclusively forward traffic to and from the multihomed device 12-1 via its local link) and the other EVPN peer device serves as the backup or standby device. If desired, multihoming EVPN peer devices 10E-1 and 10E-2 may be configured in an all-active (active-active) configuration.

FIGS. 3-8 show illustrative operations performed by EVPN peer devices (e.g., devices 10E-1, 10E-2, and/or 10E-3 in FIG. 1) relating to the exchange of routing information between EVPN peer devices, processing of exchanged information within one or more EVPN peer devices, and the forwarding of network traffic (e.g., data plane traffic) between EVPN peer devices in a networking system having a pair of EVPN peer devices in a multihoming configuration such as system 8 in FIG. 1. In illustrative configurations described herein as an example, the operations described in connection with FIGS. 3, 5, 6, and 8 may be performed by respective processing circuitry 28 of network device 10E-1, 10E-2, and 10E-3 (e.g., in the control plane of devices 10E-1, 10E-2, and 10E-3 when executing one or more control plane processes such as EVPN process 36). In illustrative configurations described herein as an example, the operations described in connection with FIGS. 4 and 7 may be performed by respective packet processor(s) 32 of network device 10E-1, 10E-2, and 10E-3 (e.g., in the data or forwarding plane of devices 10E-1, 10E-2, and 10E-3 when forwarding, dropping, or generally processing production or other data plane traffic).

Figure 3:
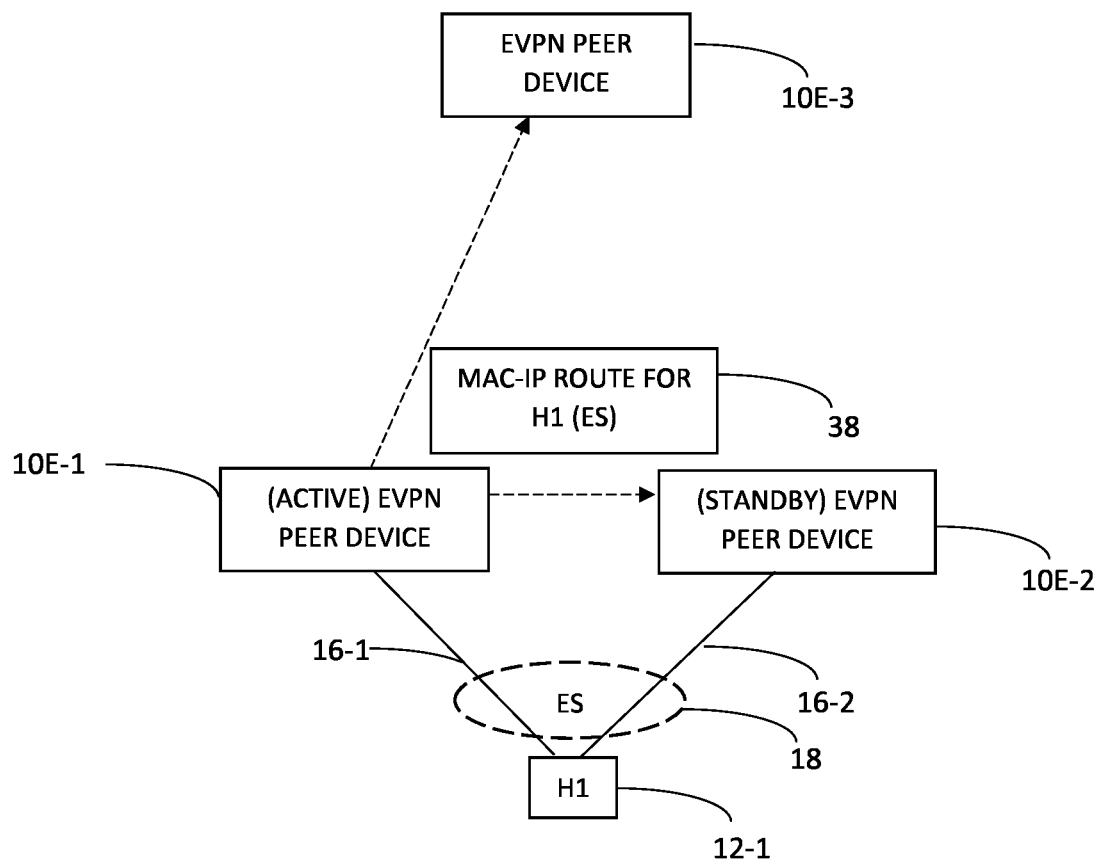
FIG. 3 is a diagram of illustrative communications performed by EVPN peer devices in accordance with some embodiments.

FIG. 3 is a diagram of illustrative EVPN route information being conveyed from or advertised by an active EVPN peer device in a multihoming configuration with another EVPN peer device such as a standby EVPN peer device. As shown in FIG. 3, a pair of devices 10E-1 and 10E-2 is configured in an active-standby configuration and is configured to multihome Ethernet segment 18 to which device 12-1 is attached. Because device 10E-1 has an active configuration and device 10E-2 has a standby configuration with respect to traffic handling for device 12-1, active EVPN peer device 10E-1 (e.g., processing circuitry 28 thereon) may advertise the route for multihomed device 12-1 to both standby EVPN peer device 10E-2 and to EVPN peer device 10E-3 over core network portion 8C in FIG. 1 (e.g., through one or more core network devices 10C).

In particular, the advertisement of the EVPN route may be in the form of message 38 such as a BGP message. Message 38 may be indicative of an EVPN MAC-IP advertisement route for device 12-1 (e.g., having an EVPN route type of 2) and contain EVPN MAC-IP advertisement route information for device 12-1. As an example, message 38 may contain the MAC address of the attached multihomed device (e.g., MAC address of device 12-1), the IP address of the attached multihomed device (e.g., IPv4 or IPv6 address of device 12-1), and the locally Ethernet segment identifier (e.g., Ethernet segment identifier of Ethernet segment 18), among other information. Message 38, or generally each EVPN MAC-IP advertisement route message, may be sent on a per-host or per-device basis (e.g., message 38 is sent specifically for device 12-1).

The advertisement and subsequent processing of message 38 may cause other EVPN peer network devices to determine and identify (e.g., learn) the reachability of device 12-1 via local link 16-1 for Ethernet segment 18 through EVPN peer device 10E-1. Message 38 may therefore sometimes be referred to as containing a non-proxy route (e.g., local to the advertising device) for reaching device 12-1 or generally indicating reachability of device 12-1 through EVPN peer device 10E-1.

As an example, EVPN peer device 10E-3 (e.g., processing circuitry 28 thereon) may receive advertisement message 38 and process the advertised MAC-IP route therein for device 12-1. Based on the processing of the MAC-IP route for device 12-1, EVPN peer device 10E-3 may store (e.g., install) routing decision data (e.g., stored as part of one or more routing information bases) and/or forwarding decision data (e.g., stored as part of one or more forwarding information bases) based on and indicative of EVPN peer device 10E-1 and/or its local link for forwarding traffic toward device 12-1.

As another example, EVPN peer device 10E-2 (e.g., processing circuitry 28 thereon) may receive advertisement message 38 and process the advertised MAC-IP route therein for device 12-1. Based on the processing of the MAC-IP route for device 12-1, EVPN peer device 10E-2 may store (e.g., install) routing decision data (e.g., stored as part of one or more routing information bases) and/or forwarding decision data (e.g., stored as part of one or more forwarding information bases) based on and indicative of EVPN peer device 10E-1 and/or its local link for forwarding traffic toward device 12-1.

Additionally, based on the processing of the MAC-IP route for device 12-1, EVPN peer device 10E-2 may generally learn about device 12-1 being attached to the Ethernet segment 18 for which device 10E-1 has a local link 16-2. In particular, EVPN peer device 10E-2 may identify and/or store information indicative of device 12-1 such as the MAC address and IP address information of device 12-1 on Ethernet segment 18. For example, while EVPN peer device 10E-1 may perform local learning to learn the MAC address of the locally attached device 12-1 (e.g., as device 10E-1 receives traffic from device 12-1), EVPN peer device 10E-2 may learn the MAC address of the locally attached device 12-1 by processing advertisement message 38 (e.g., generated by device 10E-1 based on its local learning).

Figure 4:
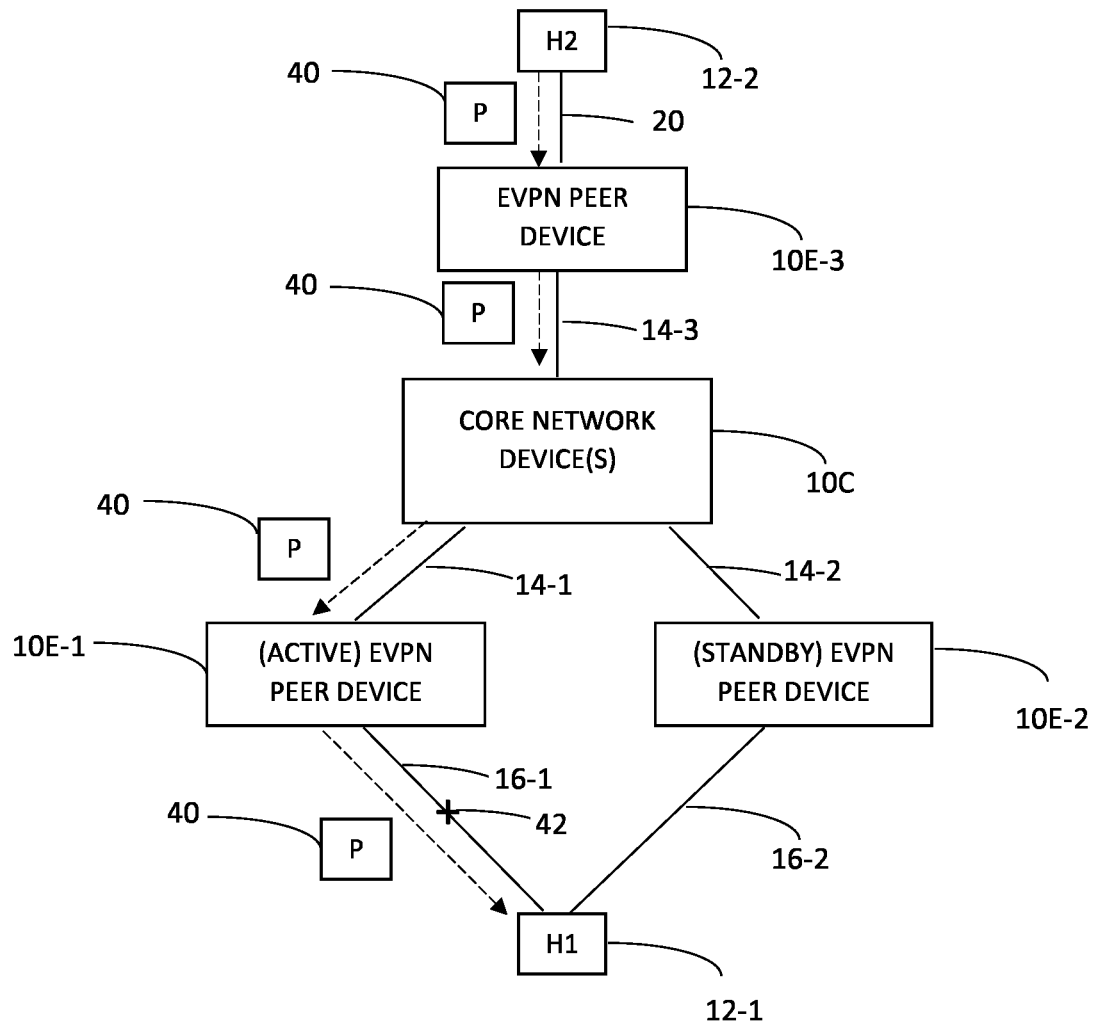
FIG. 4 is a diagram of illustrative data plane traffic being forwarded from a remote device to a single-active-multihomed device in accordance with some embodiments.

FIG. 4 is a diagram of illustrative data plane traffic being conveyed from device 12-2 to device 12-1 through active EVPN device 10E-1. As an example, host device 12-2 may send a packet 40 across link 20 to EVPN device 10E-3. EVPN device 10E-3 (e.g., packet processor 32 thereon) may process the received packet 40 (e.g., encapsulate packet 40 for transport over network 8C and through core network device(s) 10C). The processing (e.g., encapsulation) of packet 40 may be based on the routing and/or forwarding decision data generated based on message 38 (FIG. 3) advertising local attachment of device 12-1 to EVPN device 10E-1 via local link 16-1 for Ethernet segment 18.

EVPN device 10E-3 (e.g., packet processor 32 thereon) may subsequently transmit packet 40 across network 8C via paths 14-3 and 14-1 to active EVPN device 10E-1. Active EVPN device 10E-1 (e.g., packet processor 32 thereon) may subsequently transmit the received packet 40 to device 12-1 via local link 16-1.

As further illustrated in FIG. 4, local link 16-1 of Ethernet segment 18 (FIG. 3) between active EVPN device 10E-1 and device 12-1 can experience failure 42 such as an unplanned failure. While link failure 42 and the corresponding route withdrawal (e.g., in an EVPN Ethernet auto-discovery route message for Ethernet segment 18) may be advertised by active EVPN peer device 10E-1 to remote EVPN peer device 10E-3 in due time, there may be a time period during which this route withdrawal update has not propagated to and/or has not been processed by remote EVPN peer device 10E-3 and during which the traffic flow containing packet 40 is still conveyed (by device 10E-3) to active EVPN device 10E-1 but is dropped at active EVPN device 10E-1 due to link failure 42. In other words, a later sent packet 40 destined for device 12-1 received at EVPN device 10E-1 during this time period may be undesirably dropped.

Accordingly, it may be desirable to configure EVPN device 10E-1 to provide more robust handling of traffic destined for device 12-1 when experiencing link failure 42 (e.g., shortly after link 16-1 has failed). Accordingly, in preparation for a possible failure of link 16-1, EVPN device 10E-1 may store (e.g., install) a backup path such as a remote path to multihomed device 12-1 to supplement the active path such as a local path via local link 16-1.

Figure 5:
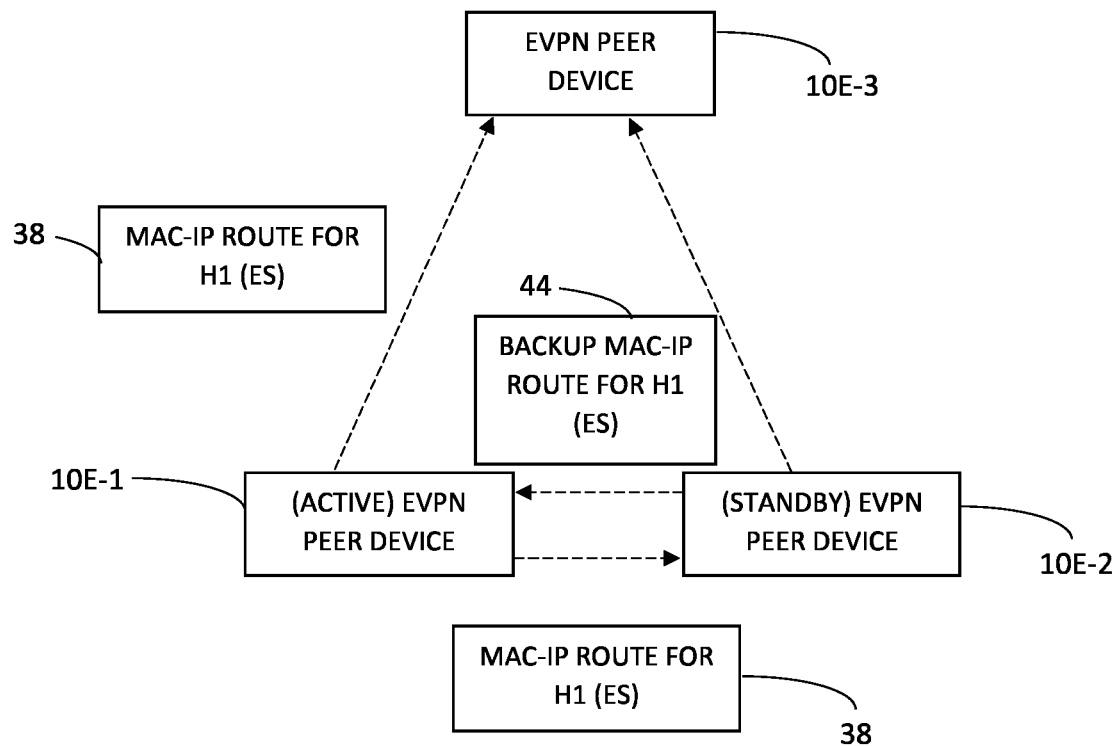
FIG. 5 is a diagram of illustrative communications performed by a standby EVPN peer device in a single-active multihoming configuration in accordance with some embodiments.

FIG. 5 is a diagram of illustrative EVPN route information being conveyed from or advertised by an EVPN peer device such as a standby EVPN peer device in a multihoming configuration with an active EVPN peer device prior to a local link failure at one of the EVPN peer devices. As shown in FIG. 5, standby EVPN peer device 10E-2 (e.g., processing circuitry 28 thereon) may advertise message 44 (e.g., a BGP message) to both active EVPN peer device 10E-1 and remote EVPN peer device 10E-3. Message 44 may be indicative of a backup EVPN MAC-IP advertisement route for device 12-1 (e.g., having an EVPN route type of 2) and contain backup EVPN MAC-IP advertisement route information for device 12-1. As an example, message 44 may contain the MAC address of the attached multihomed device (e.g., MAC address of device 12-1), the IP address of the attached multihomed device (e.g., IPv4 or IPv6 address of device 12-1), and the locally Ethernet segment identifier (e.g., Ethernet segment identifier of Ethernet segment 18), among other information. Message 44 may also be sent on a per-host or per-device basis (e.g., sent specifically for device 12-1).

Additionally, message 44 may include an indicator or indication that identifies the route therein as a backup route with respect to the active route in message 38 for device 12-1. Configurations in which the indication is provided using a route attribute such as a community attribute or a community tag (e.g., in an extended community) having information indicative of a backup route are sometimes described herein as an example. If desired, other types of such indications may be included in message 44 in addition to or instead of the community tag. Message 44 may include a corresponding label (e.g., an MPLS label) as part of the route attribute. The corresponding label may enable identification of encapsulated traffic destined for device 12-1 forwarded to EVPN peer device 10E-2 when the backup route is used.

As further illustrated in FIG. 5 and previously described in connection with FIG. 3, active EVPN peer network device 10E-1 may advertise an EVPN MAC-IP advertisement route for device 12-1 in message 38 to EVPN peer devices 10E-2 and 10E-3. In configurations described herein as an illustrative example, EVPN peer device 10E-2 may advertise message 44 based on or in response to EVPN peer device 10E-2 receiving and processing the advertised EVPN MAC-IP advertisement route for device 12-1 in message 38.

After processing message 38, standby EVPN peer device 10E-2 may determine or identify the advertising device (e.g., device 10E-1) as an active EVPN peer device in the multihoming configuration for the same locally attached Ethernet segment (e.g., Ethernet segment 18 coupled to device 12-1). As an example, standby EVPN peer device 10E-2 may make this determination based on a comparison of the Ethernet segment (identifier) contained in message 38 to the locally attached Ethernet segment at standby EVPN peer device 10E-2. Standby EVPN peer device 10E-2 may also identify device 12-1 attached to the locally attached Ethernet segment and store corresponding MAC and IP addresses of device 12-1. These types of information obtained from message 38 may be used to generate message 44 for advertising the corresponding backup MAC-IP advertisement route for device 12-1.

EVPN peer devices 10E-1 and 10E-3 may both receive the backup MAC-IP advertisement route advertised in message 44 from EVPN peer device 10E-2. EVPN peer device 10E-1 but not EVPN peer device 10E-3 may process the backup route therein for device 12-1. This is at least because the advertisement of the route contains the indication of a backup route and/or EVPN peer device 10E-1 is attached to the Ethernet segment (e.g., Ethernet segment 18) identified in the backup route while EVPN peer device 10E-3 is not. In other words, remote EVPN peer device 10E-3 may disregard or make no routing decisions based on the backup MAC-IP advertisement route while active EVPN peer device 10E-1 may process the backup MAC-IP advertisement route (e.g., using BGP processing or more specifically a path selection operation). As an illustrative example, corresponding processing of the community tag in message 44 at respective EVPN devices may cause remote EVPN peer device 10E-3 to take no routing action based on the backup MAC-IP advertisement route and may cause active local EVPN peer device 10E-1 to process the backup MAC-IP advertisement route.

Figure 6:
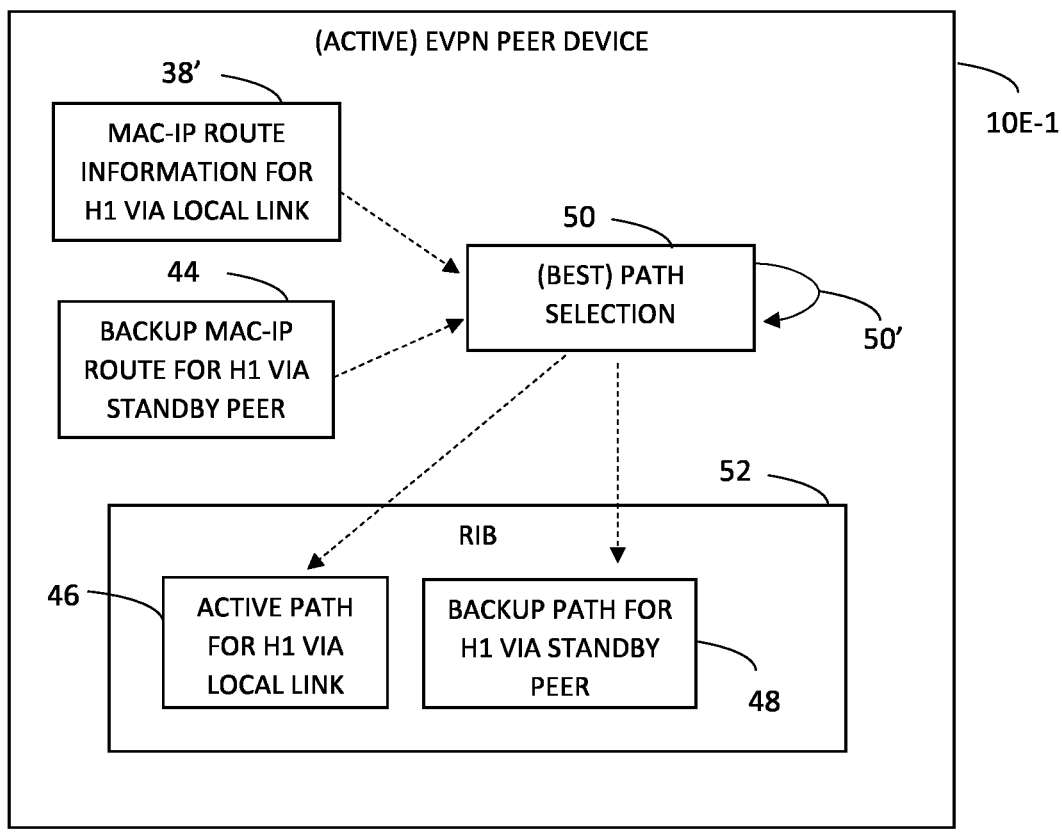
FIG. 6 is a diagram of an illustrative active EVPN peer device configured to identify a backup path based on EVPN peer device communication in accordance with some embodiments.

FIG. 6 is a diagram of an illustrative EVPN network device such as EVPN peer device 10E-1, or more specifically, the control plane or control circuitry of the EVPN network device (e.g., processing circuitry 28 and memory circuitry 30 on EVPN peer device 10E-1) that installs a backup path to supplement a primary or active path for reaching the same multihomed device on the same Ethernet segment prior to a local link failure at the EVPN network device.

In particular, processing circuitry 28 on device 10E-1 may obtain information 38' for generating MAC-IP advertisement route information for device 12-1 via local link 16-1. As an example, information 38' may be obtained via local learning by processing traffic to and/or from device 12-1 (e.g., packets received from device 12-1 on local link 16-1) to learn the local reachability of device 12-1. Processing circuitry 28 may perform a path selection operation 50 (e.g., a BGP best path computation or calculation) based on the obtained information 38' to arrive at a best path 46 for reaching device 12-1 via local link 16-1 at active EVPN device 10E-1. Processing circuitry 28 may store information for path 46 for reaching device 12-1 via local link 16-1 on routing information base (RIB) 52 (e.g., implemented as part of memory circuitry 30 or other dedicated memory circuitry on device 10E-1). In particular, the stored information may include the path attributes that define path 46. These path attributes for path 46 may be used to generate the corresponding MAC-IP advertisement route message 38 advertised by EVPN device 10E-1.

Processing circuitry 28 on device 10E-1 may also receive a backup MAC-IP advertisement route for device 12-1 via standby EVPN peer device 10E-2 as advertised by standby EVPN peer device 10E-2 (e.g., via message 44 in FIG. 5). Processing circuitry 28 may perform a second path selection operation 50' (e.g., another BGP best path computation or calculation) based on the advertised backup route information. Second path selection operation 50' may still determine that path 46 is the best path for reaching device 12-1 but may also identify a second best path for reaching device 12-1 such as backup path 48 via standby EVPN device 10E-2 (e.g., via link 16-2 local to standby EVPN device 10E-2). Processing circuitry 28 may store information for backup path 48 for reaching device 12-1 via standby EVPN peer device 10E-2 on RIB 52 (e.g., implemented as part of memory circuitry 30 on device 10E-1). In particular, the stored information may include the path attributes that define path 48.

The storage (e.g., installation) of the active and backup paths or more specifically their corresponding path attributes on RIB 52 may configure EVPN device 10E-1 to achieve a local repair of traffic handling for traffic destined for device 12-1 when active path 46 is unavailable (e.g., experiences a link failure such as when local link 16-1 fails). In other words, EVPN device 10E-1 may enable local repair by providing packet processor(s) 32 of EVPN device 10E-1 with access to backup path 48 to provide a backup traffic forwarding to EVPN peer device 10E-2 after link failure 42 (FIG. 4).

RIB 52 may represent one or more RIBs on memory circuitry 30 or other dedicated RIB-storage memory circuitry of device 10E-1 which store paths 46 and 48 for reaching device 12-1. As examples, RIB 52 may be a RIB for process 36 (e.g., a main BGP RIB), a global RIB, and/or any other bases for storing routing decision data. If desired, corresponding path attributes may further be installed in one or more forwarding information bases to facilitate access and forwarding by packet processor(s) 32 of device 10E-1.

Figure 7:
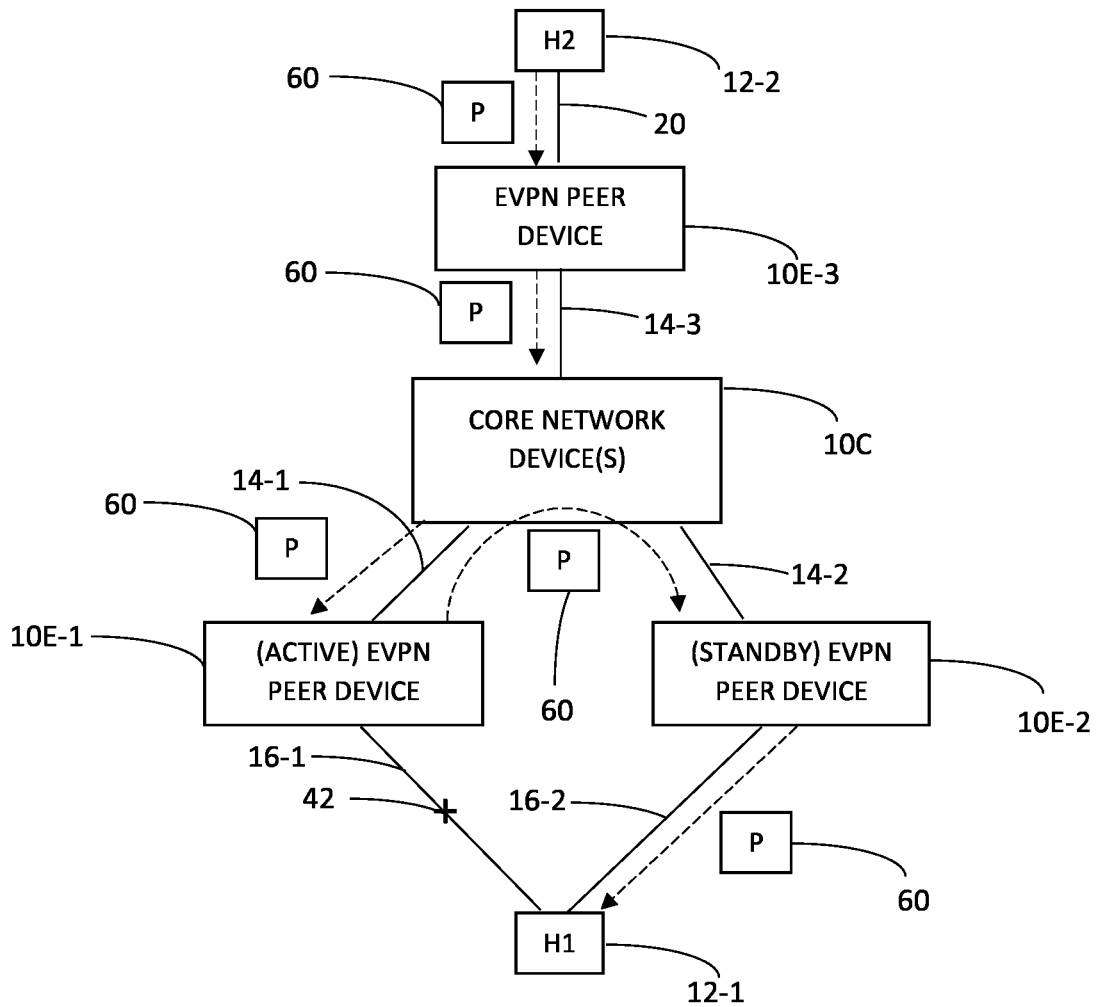
FIG. 7 is a diagram of illustrative data plane traffic being forwarded from a remote device to a single-active-multihomed device based on a backup path in accordance with some embodiments.

FIG. 7 is a diagram of illustrative data plane traffic being conveyed from device 12-2 to device 12-1 being redirected by active EVPN device 10E-1 to another EVPN device such as standby EVPN device 10E-2 as part of performing local repair. Configurations in which device 10E-1 in FIG. 7 is configured in the manner described in connection with FIG. 6 (e.g., has active path 46 and backup path 48 installed in RIB 52) are sometimes described herein as an example.

As shown in FIG. 7, host device 12-2 may send a packet 60 (e.g., a packet in the same flow as packet 40 in FIG. 4) across link 20 to EVPN device 10E-3. EVPN device 10E-3 (e.g., packet processor 32 thereon) may process the received packet 60 (e.g., encapsulate packet 60 for transport over network 8C and through core network device(s) 10C). The processing (e.g., encapsulation) of packet 60 may be based on the routing and/or forwarding decision data generated based on the message 38 (FIG. 3) advertising local attachment of device 12-1 to EVPN device 10E-1 via local link 16-1 for Ethernet segment 18.

EVPN device 10E-3 (e.g., packet processor 32 thereon) may subsequently transmit packet 60 across network 8C via paths 14-3 and 14-1 to active EVPN device 10E-1. However, because local link 16-1 has experienced failure 42, active EVPN device 10E-1 can no longer reach device 12-1 via local link 16-1 associated with the installed best active path 46 in FIG. 6. Accordingly, active EVPN device 10E-1 may determine or identify that local link 16-1 has failed. Based on this determination, EVPN device 10E-1 may disregard and/or disable primary local path 46 and use backup path 48 to forward packet 60.

In particular, EVPN device 10E-1 (e.g., packet processor 32 thereon) may process the received packet 60 (e.g., encapsulate packet 60 for transport over network 8C and through core network device(s) 10C. The processing (e.g., encapsulation) of packet 60 may be based on the routing and/or forwarding decision data generated based on the message 44 (FIG. 3) advertising attachment of device 12-1 to EVPN device 10E-2 via its local link 16-2 for Ethernet segment 18. The encapsulation of packet 60 may, in addition to the tunneling headers for traversing network 8C, the label (e.g., MPLS label) specified in message 44 that identifies or is indicative of the use of the advertised backup route. EVPN device 10E-1 (e.g., packet processor 32 thereon) may subsequently transmit packet 60 across network 8C via paths 14-1 and 14-2 to standby EVPN device 10E-2. Standby EVPN device 10E-2 (e.g., packet processor 32 thereon) may subsequently transmit the received packet 40 to device 12-1 via local link 16-2. In particular, standby EVPN device 10E-2 (e.g., packet processor 32 thereon) may identify the label in the packet encapsulation and may transmit the received packet 40 to device 12-1 via local link 16-2 based on the label.

Figure 8:
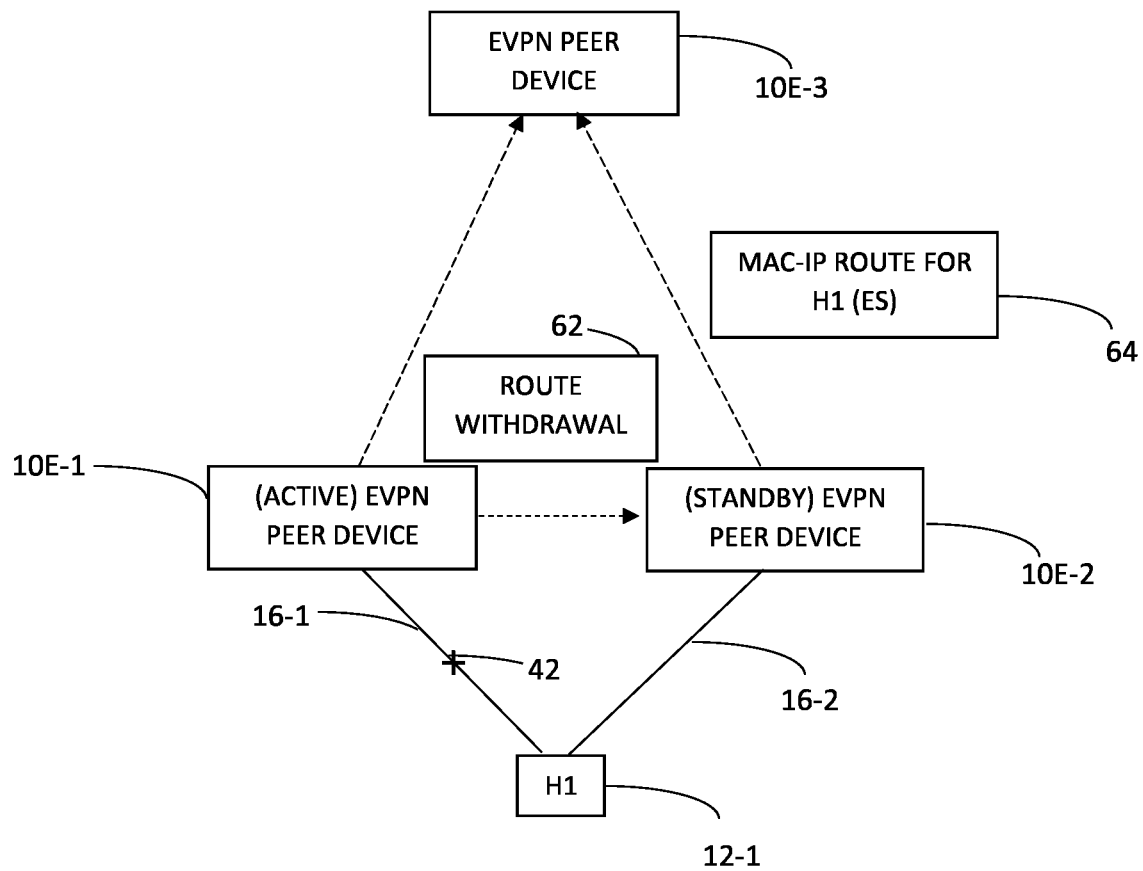
FIG. 8 is a diagram of illustrative communications performed by a standby EVPN peer device being promoted to a new active EVPN peer device in accordance with some embodiments.

FIG. 8 is a diagram of illustrative EVPN route information being conveyed from or advertised by EVPN peer devices in a multihoming configuration after a local link failure at one of the EVPN peer devices and after forwarding data plane traffic via a backup path (e.g., as described in connection with FIG. 7). In particular, after the time period during which EVPN peer device 10E-1 forwards traffic destined to device 12-1 to EVPN peer device 10E-2 via backup path 48, EVPN peer device 10E-1 may convey a route withdrawal in message 62 (e.g., due to loss of link 16-1 for Ethernet segment 18).

As an example, active EVPN peer device 10E-1 (e.g., processing circuitry 28 thereon) may advertise message 62 to both standby EVPN peer device 10E-2 and remote EVPN peer device 10E-3. Message 62 may be indicative of an EVPN Ethernet auto-discovery route (e.g., having an EVPN route type of 1) and contains route withdrawal information for Ethernet segment 18. As an example, message 62 may contain the locally Ethernet segment identifier (e.g., Ethernet segment identifier of Ethernet segment 18) of which device 10E-1 is withdrawing its local reachability, thereby indicating route withdrawal for Ethernet segment 18. Message 62, or generally each EVPN Ethernet auto-discovery route message, may be sent on a per-Ethernet-segment basis (e.g., message 62 is sent specifically for Ethernet segment 18).

EVPN peer device 10E-2 (e.g., processing circuitry 28 thereon) may receive advertisement message 62 and process the received route withdrawal therein for Ethernet segment 18. Based on the processing of the route withdrawal for Ethernet segment 18, EVPN peer device 10E-2 may remove the previously installed active path 46 indicating reachability of device 12-1 via EVPN device 10E-1 (e.g., by local link 16-1). Additionally, based on the processing of the route withdrawal for Ethernet segment 18, EVPN peer device 10E-2 may generate and advertise a non-proxy and non-backup EVPN MAC-IP route for device 12-1 via advertisement message 64. The advertised non-proxy and non-backup EVPN MAC-IP route may serve as an update to the previously advertised backup route (e.g., in message 44 of FIG. 5). In other words, message 64 advertising the non-proxy and non-backup route may serve as (e.g., include or be) an indication of a route withdrawal for the previously advertised backup route. As such, when a peer device such as peer device 10E-1 or peer device 10E-3 receives and processes message 64 containing the non-proxy and non-backup route, the receiving peer device may determine that network device 10E-2 has withdrawn the previously advertised backup route.

Message 64 may be indicative of an EVPN MAC-IP advertisement route for device 12-1 (e.g., having an EVPN route type of 2) and contain EVPN MAC-IP advertisement route information for device 12-1. As an example, message 64 may contain the MAC address of the multihomed device (e.g., MAC address of device 12-1), the IP address of the multihomed device (e.g., IPv4 or IPv6 address of device 12-1), and the locally Ethernet segment identifier (e.g., Ethernet segment identifier of Ethernet segment 18), among other information.

EVPN peer device 10E-3 (e.g., processing circuitry 28 thereon) may receive route withdrawal advertisement message 62 and process the received route withdrawal therein for Ethernet segment 18. Based on the processing of the route withdrawal for Ethernet segment 18, EVPN peer device 10E-3 may remove (e.g., disable) the previously installed active path for reaching device 12-1 based on reachability of device 12-1 via local link 16-1 at EVPN device 10E-1.

EVPN peer device 10E-3 (e.g., processing circuitry 28 thereon) may further receive MAC-IP advertisement route message 64 and process the received MAC-IP advertisement route therein for device 12-1. Based on the processing of the MAC-IP advertisement route for device 12-1, EVPN peer device 10E-3 may generate and install a new active path for reaching device 12-1 based on reachability of device 12-1 via local link 16-2 at EVPN device 10E-2. The new active path may specify corresponding encapsulation to facilitate traversal across network 8C to EVPN device 10E-2 for traffic destined for device 12-1.

Operations may continue with the previously standby EVPN peer device 10E-2 becoming the new active EVPN device. In particular, EVPN device 10E-2 may provide reachability to Ethernet segment 18 and device 12-1 thereon and device 10E-3 has installed a path (e.g., on its RIB) indicating device 10E-2 for reaching Ethernet segment 18 and device 12-1 thereon. Respective packet processor(s) 32 on devices 10E-3 and 10E-2 may convey traffic (e.g., through the appropriate encapsulation as determined via the routing and/or forwarding decision data and corresponding decapsulation) from device 12-2 to 12-1 via links 20, 14-3, and 14-2 (FIG. 1) and local link 16-2 at device 10E-2. Accordingly, EVPN peer device 10E-1 may remove the previously installed backup path 48 via device 10E-2 and/or update the previously installed backup path 48 via device 10E-2 as the active path.

FIGS. 3-8 illustrate EVPN peer device 10E-2 as a standby device in a multihoming configuration. However, this is merely illustrative. If desired, EVPN peer device 10E-2 may be an active device in an active-active multihoming configuration and may perform at least some (e.g., all) of the operations described in connection with FIGS. 3-8.

Figure 9:
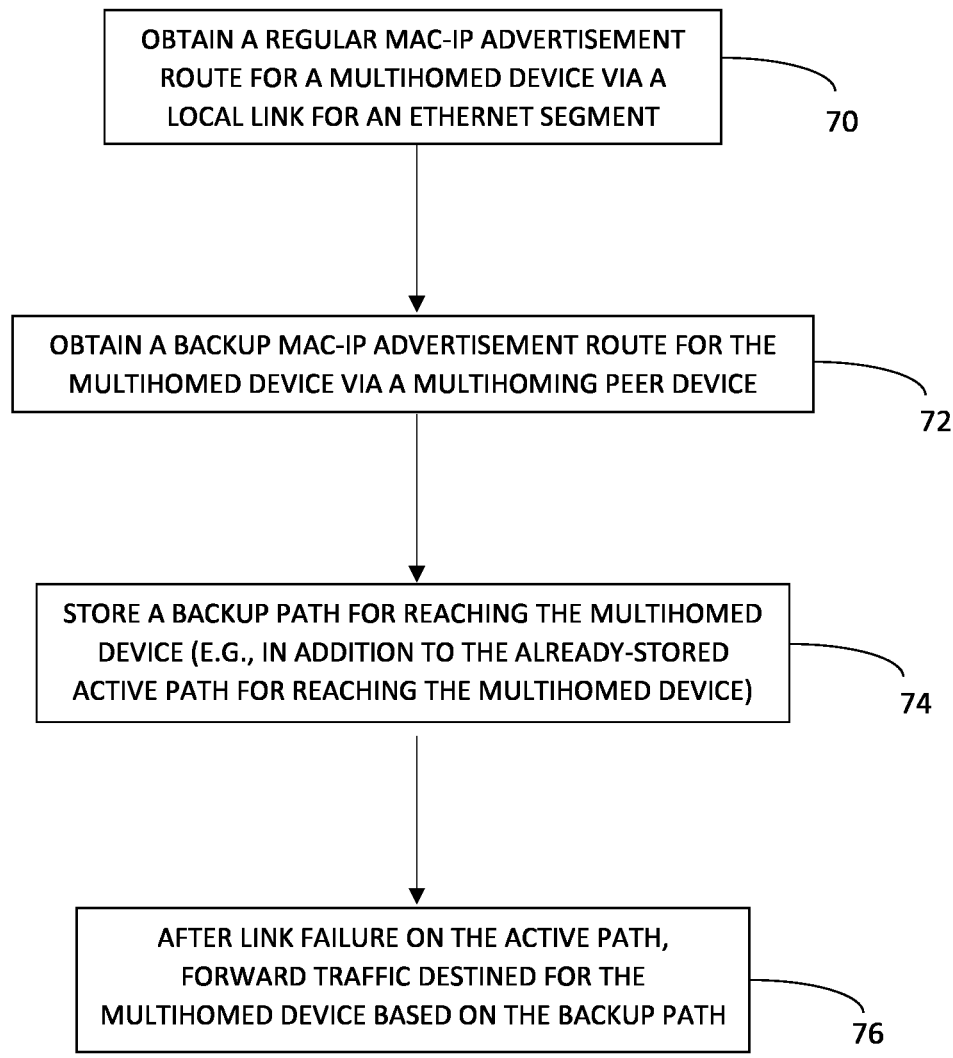
FIG. 9 is a flowchart of illustrative operations for handling failure at a local link of an active EVPN peer device in accordance with some embodiments.

FIG. 9 is a flowchart of illustrative operations for operating one or more EVPN peer devices operating in a multihoming configuration. These operations may be performed at control plane control circuitry 30 in each EVPN device such as device 10E-1, device 10E-2 and/or device 10E-3 and/or data plane packet processor(s) 32 in each EVPN device such as device 10E-1, device 10E-2 and/or device 10E-3. The illustrative operations described in connection with FIG. 9 performed by one or more processors (e.g., processing circuitry and/or packet processors) in each EVPN device may be performed by executing software instructions stored on corresponding memory circuitry 30 (e.g., one or more non-transitory computer-readable media). If desired, one or more operations described in connection with FIG. 9 may be performed by other dedicated hardware components in each EVPN device.

At block 70, control circuitry 30 on a first EVPN device such as device 10E-1 (FIGS. 3-8) may obtain a regular (e.g., non-backup) MAC-IP advertisement route for a multihomed device via a local link for an Ethernet segment. In particular, control circuitry 30 may perform local learning to obtain information indicative of the multihomed device (e.g., MAC and IP address of the multihomed device) and/or the local attachment to the multihomed device via the local link. Control circuitry 30 on the first EVPN device may generate the MAC-IP advertisement route based on the obtained information. Control circuitry 30 on the first EVPN device may share or advertise the MAC-IP advertisement route via one or more BGP route advertisement messages with at least one peer EVPN device such as device 10E-2 (FIGS. 3-8).

At block 72, control circuitry 30 on the first EVPN device may obtain a backup MAC-IP advertisement route for the multihomed device via the at least one peer EVPN device. In particular, control circuitry 30 on the peer EVPN device may advertise the backup MAC-IP advertisement route for the multihomed device based on receiving and processing the regular MAC-IP advertisement route advertised by control circuitry 30 on the first EVPN device.

At block 74, control circuitry 30 on the first EVPN device may store a backup path for reaching the multihomed device. In particular, control circuitry 30 on the first EVPN device may have already stored an active path for reaching the multihomed device. The regular MAC-IP advertisement route that is obtained (e.g., generated) and subsequently advertised may be based on the active path. Additionally, based on the obtained backup MAC-IP advertisement route, control circuitry 30 on the first EVPN device may also store a backup path toward the peer EVPN device for reaching the multihomed device.

At block 76, after link failure on the active path (e.g., on the local link of the first EVPN device), packet processor(s) on the first EVPN device may forward traffic destined for the multihomed device based on the backup path (instead of dropping the traffic based on using the active path).

The methods and operations described above in connection with FIGS. 1-9 may be performed by the components of one or more network devices and/or server or other host equipment using software, firmware, and/or hardware (e.g., dedicated circuitry or hardware). Software code for performing these operations may be stored on non-transitory computer readable storage media (e.g., tangible computer readable storage media) stored on one or more of the components of the network device(s) and/or server or other host equipment. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device(s) and/or server or other host equipment (e.g., processing circuitry 28 in network device(s) 10E, packet processor(s) 32 in network device(s) 10E, etc.).

The foregoing is merely illustrative and various modifications can be made to the described embodiments. The foregoing embodiments may be implemented individually or in any combination.

What is claimed is:

1. A network device operable with a peer network device for multihoming a host, the network device being in an active configuration for the multihoming of the host, the network device comprising:
   control circuitry configured to
   store an active local path for reaching the host,
   receive a backup route message advertised by the peer network device and containing a Media Access Control (MAC) address of the host and an Internet Protocol (IP) address of the host, wherein the received backup route message comprises an Ethernet Virtual Private Network (EVPN) type-2 route, an indicator that the EVPN type-2 route is a backup route, and a Multiprotocol Label Switching (MPLS) label associated with the EVPN type-2 route as the backup route, and
   store a backup remote path for reaching the host based on the backup route message advertised by the peer network device; and
   a packet processor configured to receive traffic destined for the host and process the received traffic using the backup remote path by encapsulating the traffic with the MPLS label in response to a link failure on the active local path.

2. The network device defined in claim 1, wherein the active local path comprises a first Ethernet link attaching the network device to the host, wherein the backup remote path comprises the peer network device attached to the host via a second Ethernet link, and wherein the first and second Ethernet links form an Ethernet segment coupled to the host.

3. The network device defined in claim 2, wherein the peer network device is in a standby configuration for the multihoming of the host.

4. The network device defined in claim 2, wherein the control circuitry is configured to advertise a route withdrawal message indicating withdrawal of reachability for the Ethernet segment based on the link failure and wherein the packet processor is configured to process the received traffic using the backup remote path prior to the advertisement of the route withdrawal message.

5. The network device defined in claim 4, wherein the route withdrawal message is an EVPN Ethernet auto-discovery route message.

6. The network device defined in claim 2, wherein the link failure is on the first Ethernet link and wherein the packet processor is configured to process the received traffic using the backup remote path by forwarding the received traffic toward the peer network device.

7. The network device defined in claim 1, wherein the control circuitry is configured to store, prior to the link failure, the backup remote path for reaching the host.

8. The network device defined in claim 1, wherein the control circuitry is configured to advertise, toward the peer network device, a non-proxy route message and wherein the non-proxy route message contains the MAC address of the host and the IP address of the host.

9. The network device defined in claim 8, wherein processing of the advertised non-proxy route message at the peer network device causes the advertisement of the backup route message by the peer network device toward the network device.

10. The network device defined in claim 1, wherein the indicator comprises a community tag in an extended community of the EVPN type-2 route indicative of the EVPN type-2 route being the backup route.

11. A network device operable with a peer network device for multihoming a host, the peer network device being in an active configuration for the multihoming of the host, the network device comprising:
    control circuitry configured to
    receive a route message containing a Media Access Control (MAC) address of the host and an Internet Protocol (IP) address of the host and advertised by the peer network device,
    store an active path, for reaching the host, that is indicated by the route message advertised by the peer network device and that is remote from the network device, and
    advertise a backup route message containing the MAC address of the host, the IP address of the host, and a label, wherein the backup route message identifies an Ethernet Virtual Private Network (EVPN) type-2 route as a backup route and wherein the label comprises a Multiprotocol Label Switching (MPLS) label indicative of using the EVPN type-2 route as the backup route; and
    a packet processor configured to receive traffic encapsulated with the MPLS label and destined for the host and forward the received traffic toward the host using a local link attached to the host.

12. The network device defined in claim 11, wherein the network device is in a standby configuration for the multihoming of the host.

13. The network device defined in claim 12, wherein the active path comprises the peer network device attached to the host via a first Ethernet link, wherein the local link comprises a second Ethernet link attaching the network device to the host, and wherein the first and second Ethernet links form an Ethernet segment coupled to the host.

14. The network device defined in claim 11, wherein the control circuitry is configured to advertise the backup route message based on the received route message advertised by the peer network device.

15. The network device defined in claim 11, wherein the packet processor is configured to receive the traffic encapsulated with the MPLS label and destined for the host after a link failure at the peer network device and wherein the control circuitry is configured to advertise the backup route message prior to the link failure.

16. The network device defined in claim 11, wherein the backup route message comprises a community tag in an extended community indicative of the EVPN type-2 route being the backup route.

17. A method for operating an active Ethernet Virtual Private Network (EVPN) network device configured to multihome, with a standby EVPN network device, a host device via an Ethernet segment, the method comprising:
    advertising, by the active EVPN network device, a first Media Access Control (MAC) and Internet Protocol (IP) advertisement route indicative of a first link between the active EVPN network device and the host device that forms the Ethernet segment;
    receiving, by the active EVPN network device, a backup MAC and IP advertisement route advertised by the standby EVPN network device indicative of a second link between the standby EVPN network device and the host device that forms the Ethernet segment, wherein the backup MAC and IP advertisement route includes a community tag in an extended community indicating that the backup MAC and IP advertisement route is a backup route and wherein the backup MAC and IP advertisement route includes a label indicative of using the backup MAC and IP advertisement route;
    storing, at a routing information base of the active EVPN network device, a backup path for reaching the host device via the standby EVPN network device based on the backup MAC and IP advertisement route; and
    after failure of the first link,
        forwarding traffic destined for the host device at least in part by encapsulating the traffic to include the label based on the stored backup path.

18. The method defined in claim 17 further comprising:
    after forwarding the traffic destined for the host device based on the stored backup path,
        advertising, by the active EVPN network device, an Ethernet auto-discovery route indicating withdrawal of reachability of the Ethernet segment.

19. The method defined in claim 17 further comprising:
    prior to receiving the backup MAC and IP advertisement route,
        performing a first best path computation to identify the first link as an active path; and
    after receiving the backup MAC and IP advertisement route and prior to the failure of the first link,
        performing a second best path computation to identify the backup path based on the backup MAC and IP advertisement route advertised by the standby EVPN network device.

20. The method defined in claim 17, wherein the label comprises a Multiprotocol Label Switching (MPLS) label indicative of using the backup MAC and IP advertisement route.

* * * * *